United States Patent
Leins et al.

(10) Patent No.: US 6,883,030 B1
(45) Date of Patent: Apr. 19, 2005

(54) DATA VISUALIZATION WITH INDEPENDENT DATA-UTILIZATION AND DATA-SUPPLYING COMPONENTS

(75) Inventors: Ralf Leins, Ispringen (DE); Ronald Lange, Fuerth (DE); Juergen Schmoll, Markt Berolzheim (DE); Harald Herberth, Oberasbach (DE); Ulrich Braun, Nuremberg (DE); Klaus Pechmann, Feucht (DE); Peter Wagner, Hersbruck (DE); Horst Walz, Straubenhardt (DE); George-Chiao-Chi Lo, Johnson City, TN (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,046

(22) PCT Filed: Jan. 15, 1999

(86) PCT No.: PCT/EP99/00221

§ 371 (c)(1),
(2), (4) Date: Nov. 9, 2000

(87) PCT Pub. No.: WO99/39251

PCT Pub. Date: Aug. 5, 1999

(30) Foreign Application Priority Data

Jan. 28, 1998 (EP) .............................. 98101458

(51) Int. Cl.$^7$ .............................. G06F 15/16
(52) U.S. Cl. .............. 709/227; 709/228; 709/229; 709/201; 700/83; 700/17; 700/18; 398/109
(58) Field of Search ................ 709/227–229, 709/201, 200, 202, 203, 217, 219, 223, 224; 700/83, 17, 18

(56) References Cited

U.S. PATENT DOCUMENTS

| | | | | |
|---|---|---|---|---|
| 5,477,445 A | * | 12/1995 | Weber | 700/83 |
| 5,790,800 A | * | 8/1998 | Gauvin et al. | 709/227 |
| 5,805,442 A | * | 9/1998 | Crater et al. | 700/9 |
| 5,974,257 A | * | 10/1999 | Austin | 717/125 |

FOREIGN PATENT DOCUMENTS

| | | |
|---|---|---|
| DE | 196 25 841 | 1/1998 |
| EP | 0 660 231 | 6/1995 |
| EP | 0 762 273 | 3/1997 |

OTHER PUBLICATIONS

Anger, "Windows NT and 95 OSS, OPC, Activex, and RAD Tools Shape Course of OL Software", I & CS—Industrial and Process Control Magazine, vol. 69, No. 11, Nov. 1, 1996, pp. 49–54, Copy of reference is not enclosed because reference is cited in Search Report (copy of reference provided by International Searching Authority).

Shepherd et al., "How MFC Does Activex Connections", Dr. Dobbs Journal, vol. 22, No. 4, Apr. 1, 1997, Copy of reference is not enclosed because reference is cited in Search Report (copy of reference provided by International Searching Authority).

(Continued)

*Primary Examiner*—Glenton B. Burgess
*Assistant Examiner*—Anita Choudhary
(74) *Attorney, Agent, or Firm*—Kenyon & Kenyon

(57) ABSTRACT

The embodiment of a respective application-specific call code, necessary in the existing art, as an external control element implemented in a separate component is described. The external control element is usable in any desired containers without thereby modifying the containers themselves or even knowing them at the time the external control element is designed. This may be used in data or information transmission systems, in particular process visualization systems. The components are implemented as software components, in particular as so-called ActiveX controls.

3 Claims, 5 Drawing Sheets

OTHER PUBLICATIONS

Schmoll, "Wird Ole For Process Control (OPC) Ein Neuer Industriestandard?", Automatisierungstechnische Praxis—ATP, vol. 39, No. 5, May 1, 1997, pp. 11/12, 14–17, Copy of reference is not enclosed because reference is cited in Search Report (copy of reference provided by International Searching Authority).

Lange, "Einsatz von Standards in Der Prozessvisualisierung. Integration of Standards in the Process–Visualisation", Automatisierungstechnische Praxis—ATP, vol. 36, No. 3, Mar. 1, 1994, pp., 20–22, 24–27, Copy of reference is not enclosed because reference is cited in Search Report (copy of reference provided by International Searching Authority).

Mick, "Client/Server Computing Comes to the Plant Floor", I & CS—Industrial and Process Control Magazine, vol. 66, No. 9, Sep. 1, 1993, pp. 41/42, 47–49, Copy of reference is not enclosed because reference is cited in Search Report (copy of reference provided by International Searching Authority).

"Bewegliche Ziele [Moving Targets]", c't 12/96, Heinz Heise Verlag, Hannover, pp. 258–264, Described in the Specification.

* cited by examiner

DATA VISUALIZATION WITH INDEPENDENT DATA-UTILIZATION AND DATA-SUPPLYING COMPONENTS

FIELD OF THE INVENTION

The present invention relates to a data or information transmission system, in particular for visualizing data, e.g., process data, or events, having at least one substantially data-supplying component and at least one substantially data-utilizing component.

BACKGROUND INFORMATION

Data or information transmission systems are used, for example, to control and/or monitor a controlled and/or monitored external technical process. For that purpose, the data or information transmission system has at least one processing and memory device, in particular a microprocessor having an associated memory, and a visualization device drivable by the processing and memory device, in particular a screen. For coupling with the technical process, means for connecting external sensors or actuators of the controlled and/or monitored technical process are provided for the data or information transmission system.

In this context, for monitoring of the technical process the data or information transmission takes place substantially in one direction, namely from the technical process toward the visualization device. In order to control the technical process, however, the data or information transmission takes place substantially in the opposite direction, namely from the visualization device to the technical process. The present invention concerns data and information transmissions of the kind described above, as well as mixed forms of the kind described above. A "mixed form" is understood in this context as, for example, a data or information transmission that occurs substantially in the direction of the visualization device, the visualization device also having, in addition to mere information preparation for the user, operating capabilities which permit influencing of the technical process and thus require a data or information transmission to the technical process.

Data or information transmission systems of the type described above are known as process visualization systems. Because of the increased flexibility resulting therefrom, process visualization systems are increasingly being embodied in software.

The substantially data-supplying component, hereinafter the "server," is in this connection, for example, a software component effecting the data transfer between the technical process and the processing and memory device. The component substantially data-utilizing component, hereinafter the "client," is in this connection, for example, a software component effecting display of the data received from the client.

Conventional process visualization systems have the disadvantage, however, that the client or a higher-order container application contains a code designating the server, this code making it possible to use the services of the server (e.g., access to the data supplied by the server).

The result of this disadvantage is that a client embodied as a software component could not hitherto be implemented independently of a server embodied as a software component.

SUMMARY

It is an object of the present invention on the one hand to circumvent this disadvantage and on the other hand to provide a data or information transmission system in which a data-utilizing component can be implemented independently of a data-supplying component.

This object is achieved by way of a data or information transmission system for the visualization of data, in particular process data, or events, having a processing and memory device, in particular a microprocessor with an associated memory; having a visualization device drivable by the latter, in particular a screen; and having an arrangement for connecting external sensors or actuators of a controlled and/or monitored technical process, in that at least one substantially data-supplying component, hereinafter the "server"; at least one substantially data-utilizing component, hereinafter the "client"[1]; and at least one control, management, or distribution component, hereinafter the "external control element," are provided;

no direct data or information exchange capability exists between client and server, so that the data or information exchange is effected by way of the external control element by the fact that the data or information exchange takes place exclusively between server and external control element on the one hand, and external control element and client on the other hand;

data or information can be received by way of the server from the process, the data or information being capable of being visualized by way of the client;

at least the client is embodied as a software component having at least one external interface, hereinafter a "property"; and that the data or information exchange from or to the client is accomplished exclusively by way of the property; and the data or information exchange brings about the execution of a code associated with the property.

With a data or information transmission system configured in this fashion, each data-utilizing component (each client) is implemented entirely independently of the other participating components, i.e., the control, management, or distribution component (external control element) and the data-supplying component (server).

An advantageous development of the present invention lies furthermore in the fact that in the data or information transmission system, the external control element has arrangement for identification of the reachable clients; and that for the external control element, a reference to the reachable clients can be stored. The references of the reachable clients can be prepared in user-selectable fashion. In addition, the properties of the client reachable via the respective reference are accessible on the basis of a user-selectable reference, so that the communication relationship between external control element and client is definable. This is made possible by the fact that for the external control element, at least one transmittable datum, or a reference to a transmittable datum, can be stored for each property that is accessible for a reachable client. In this context, the aforesaid means for identification are independent of the container in that the services used are ones which have a container or make one available for use in standard fashion, so that fundamentally any desired containers can be used.

The present invention can advantageously be used, for example, in a process visualization system for visualizing the states of a technical process.

Further features, advantages, and potential applications of the present invention are evident from the description below of exemplary embodiments with reference to the drawings, and the drawings themselves. In this context, all the features described and/or depicted visually constitute, of themselves or in any desired combination, the subject matter of the present invention, regardless of their combination in the claims or internal references therein.

DETAILED DESCRIPTION OF THE DRAWINGS

Figure 1:
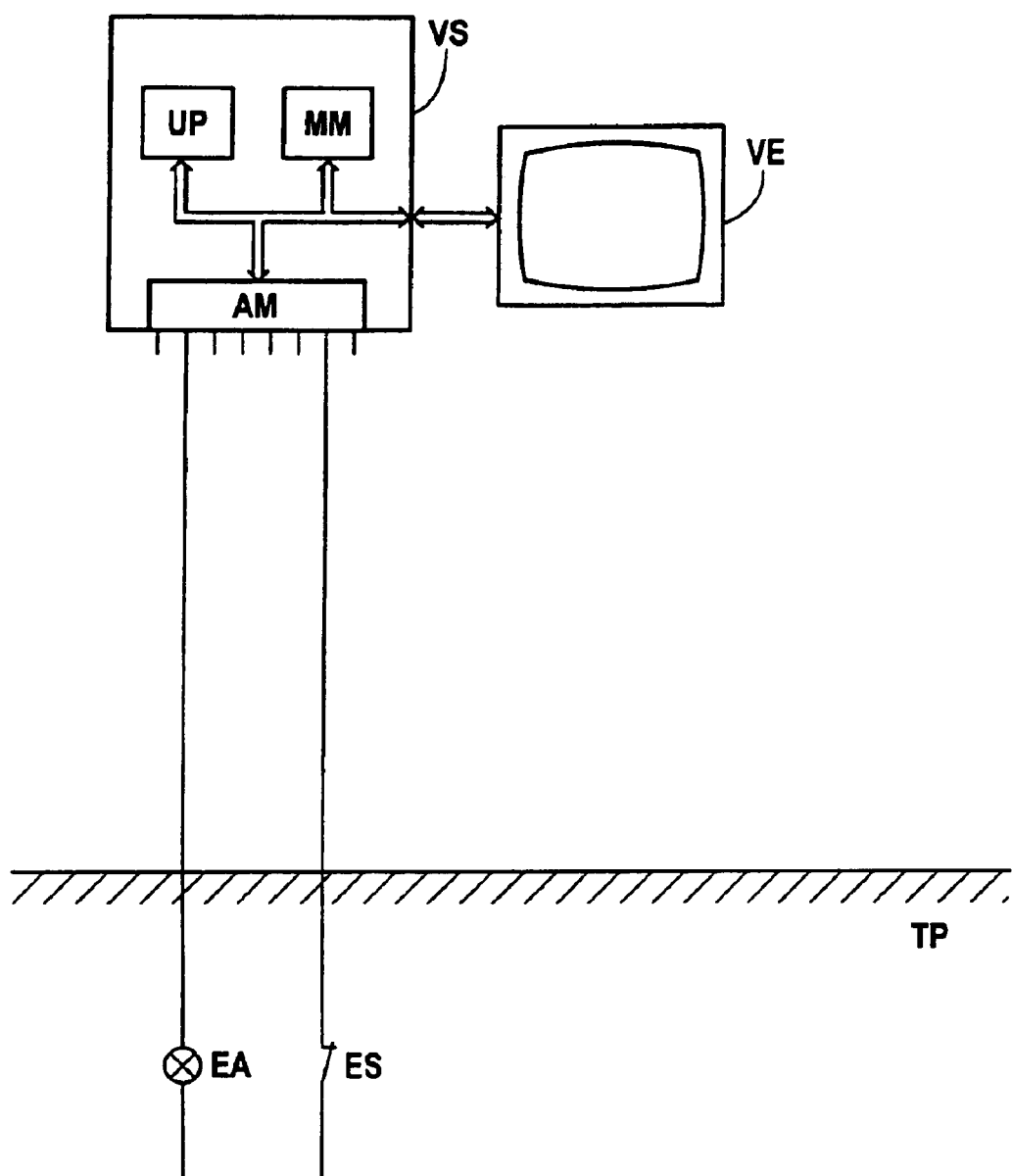
FIG. 1 shows a simplified schematic depiction of a data or information transmission system.

As shown in FIG. 1, the data or information transmission system has at least one processing and memory device VS, and a visualization device VE drivable thereby. In the depiction of FIG. 1, processing and memory device VS itself has at least one microprocessor UP and one memory MM. Microprocessor UP brings about execution of the code stored in memory MM. The code stored in memory MM also includes at least the code of the client CL, server SV, and external control element AS software components. The data and information transmitted between external control element AS and client CL on the one hand, and external control element AS and server SV on the other hand, can also be stored in memory MM. To allow access by microprocessor UP to memory MM, a communication capability exists between microprocessor UP and memory MM.

A communication capability furthermore exists between processing and memory device VS and visualization device VE, which in the depiction of FIG. 1 is embodied as screen VE. Visualization device VE is drivable by processing and memory device VS, so that the visualization of data, in particular process data, or events of a controlled and/or monitored technical process can be implemented with the data or information transmission system.

Communication with technical process TP is implemented by an arrangement for connecting external sensors ES or actuators EA of technical process TP. The arrangement for external sensors ES or external actuators include are, for example, digital or analog input subassemblies or digital or analog output subassemblies of a stored-program control system.

The present invention is, of course, not limited to data sources of the aforesaid kind; in fact, the present invention can also be used to read data from any data source, for example including a user maintenance system (i.e. a software application). In such a case, the datum that is read is then the authorization for an action (Boolean property: action may/may not be executed).

Technical process TP is not depicted in detail in FIG. 1. Merely by way of example, a light EA is depicted as external actuator EA, and a feeler ES as external sensor ES. It is self-evident, however, that in conjunction with the present description, the term "external actuator EA" refers to any type of actuator, e.g. motors or variable-speed drives, and the term "external sensor ES" refers to any type of sensor, e.g., limit value monitors and measured value sensors of any kind.

In this connection, also that processing and memory device VS can be implemented by the central processing unit of a stored-program control system that is communicatively connected to input and output subassemblies which are provided for use with the respective central processing unit.

With reference to FIG. 1, the following constellation (not depicted in FIG. 1) can also exist: A first processing and memory device VS, for example the central processing unit of a stored-program control system having connection-means AM for connecting the process peripherals EA, ES, can be communicatively connected to a second processing and memory device, e.g., a personal computer, the second processing and memory device being provided to drive the visualization device. In such a constellation, the data or information transmission system according to the present invention comprises two processing and memory devices, the second, additional processing and memory device being used substantially because of the software applications or tools available for the particular platform selected. In addition, with two processing and memory devices a true decoupling between the control and visualization of technical process TP is possible.

Fundamentally, however, any computer system that can be connected to industrially qualified peripherals is suitable for the data or information transmission system according to the present invention. In this context, the connection to the industrially qualified peripherals can also be implemented via any desired communication connections, in particular networks, so that no particular demands in terms of its industrial qualification need to be made on the computer system itself.

Figure 2:
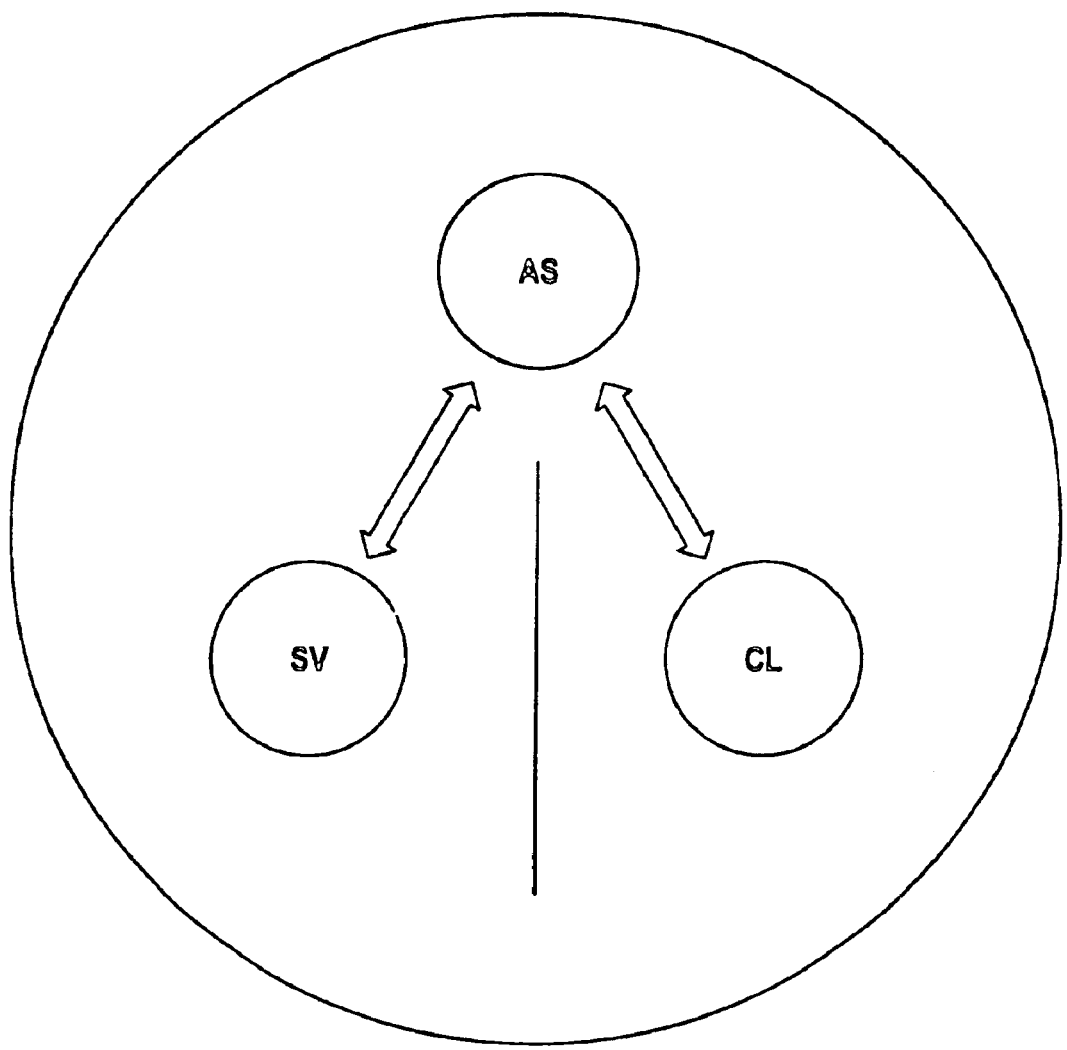
FIG. 2 shows a schematic depiction of the communication relationship among the components of the data or information transmission system.

FIG. 2 schematically depicts the communication relationship among the components: substantially data-supplying component SV (server SV); substantially data-utilizing component CL (client CL); and control, management, or distribution component AS (external control element AS) of the data or information transmission system.

The two double arrows indicate that the data or information exchange is effected by external control element AS by the fact that data or information exchange takes place exclusively between server SV and external control element AS on the one hand, and external control element AS and client CL on the other hand. The line between client CL and server SV illustrates the fact that no direct data or information exchange capability exists between client CL and server SV.

In particular in the case of a data or information transmission system of the described kind described above, client CL described above is a visualization object CL which—because it is implemented as a software component, or object—can be instantiated more than once, so that a visualization object CL, e.g., for the visualization of a control light, can be used more than once in the context of the data or information transmission system. Even though only one client CL is depicted in FIG. 2, a plurality of clients CL can be used in a data or information transmission system.

The server, which in FIG. 2 is depicted as a separate component, does not necessarily need to be embodied as a software component; in the simplest case, memory MM of processing and memory device VS functions as server VS, for example by the fact that the so-called process image of a technical process TP controlled and/or monitored by a stored-program control system is stored in main memory MM of the central processing unit of the stored-program control system.

Separate software components may be used for server SV as well, however, for purposes of data encapsulation—since direct access to data maintained in memory MM often needs to be prevented—and especially if preprocessing or further processing of the data is necessary prior to actual visualization of the data. Preprocessing or further processing of this kind is accomplished, for example, with a controller, implemented as a software component, for controlling external technical variables.

In such a case, the controller implemented as a software component is a server SV in accordance with FIG. 2. Analogously to the clients, more than one server SV of this kind can be present in a data or information transmission system, either by the fact that, for example, multiple controllers SV of comparable functionality are instantiated more than once and thus are present more than once in the system, or by the fact that a plurality of controllers SV of differing functionality are used.

A constellation fundamentally analogous to the conditions described above is present if the controller implemented as a software component is implemented, for example, as a so-called functional module of a stored-program control system. A controller functional module of this kind is then embodied, for example, on a first processing and memory device VS described in conjunction with FIG. 1, the initial values of the controller being stored in a memory. From this memory, the data are retrieved by a server SV implemented on the second processing and memory device, by the fact that a read access to the respective memory regions takes place.

Further examples of servers SV usable in a data or information transmission system are, for example, the controllers described above. In addition, for example, limit value monitors also a process data preparation system for logging purposes can be implemented as servers SV in the context of the present description. In addition, however, it is also possible to implement servers that do not offer any processing service of their own and thus are provided substantially for data encapsulation and for transfer of the encapsulated data.

Examples of a client CL usable in a data or information transmission system are, for example, visualization objects CL for visualizing digital or analog variables; visualization objects CL for visualizing measurement instruments; visualization objects CL for displaying plain text messages, e.g., for displaying error messages; visualization objects CL which display the status—on/off, forward/backward, etc.—of a component of technical process TP by way of a color change, etc.

In addition to a plurality of clients CL and servers SV in a data or information transmission system, a plurality of external control elements AS in one and the same data or information transmission system is possible, for example if data and information transfer between all controllers SV implemented as servers SV and the relevant visualization objects CL implemented as clients CL is effected by way of a first external control element AS, data and information transfer between all limit value monitors SV and the relevant visualization objects CL is effected by a second external control element AS, and data and information transfer between the remaining servers SV and the pertinent visualization objects CL is effected by a further external control element AS.

On the other hand, a more common application is that in which one external control element is provided for each image that is to be visualized (in each of which a portion of technical process TP is visualized). When switching from one image to the next, the relevant external control element is activated or deactivated so as not to read data or process values for images that are not visible on the screen.

Figure 3:
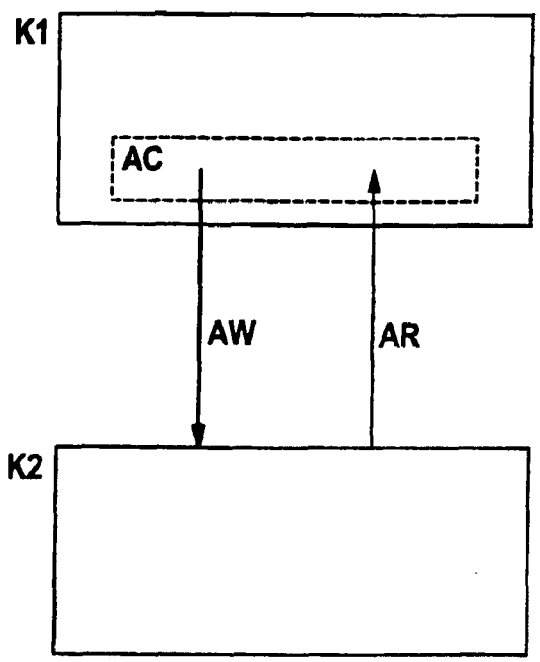
FIG. 3 shows a schematic depiction of an interaction between two software components.

FIG. 3 schematically depicts the conventional interaction between two software components K1, K2. The direction of the arrows here describes only the data flow; for both data flow directions, the particular action is initiated by software component K1, which has a specific call code AC in order to initiate the particular action. Call code AC is specific in that it explicitly indicates on the one hand the data flow direction and on the other hand the source or destination of the data flow. In the case of a write call AW, data or information proceeding from component K1 is transferred to component K2. In the case of a read call AR, data or information is read from component K2 and transferred to component K1. Although software component K1 can even now be implemented—with the exception of call code AC—with an eye toward high flexibility and expanded reusability, there still remains the portion that adapts to the particular communication relationship, that portion being depicted in FIG. 3 as call code AC.

In addition, a software component K1 implemented in this fashion can no longer be influenced from the outside. If the visualized values are, for example, to be defined from the outside by way of a manual input, they cannot be transmitted directly to software component K1.

Referring back to the data or information transmission system with which the invention is being elucidated, component K1 as shown in FIG. 3 corresponds, for example, to a substantially data-utilizing component K1 (a client CL). This makes the disadvantage of the existing art particularly clear, since without a development of the existing art—for each client the communication relationship must be indicated explicitly, namely by way of call code AC that is specific for each individual client CL of a data or information transmission system, said code defining the particular communication relationship between client CL and the data and information intended for the particular client CL.

Figure 4:
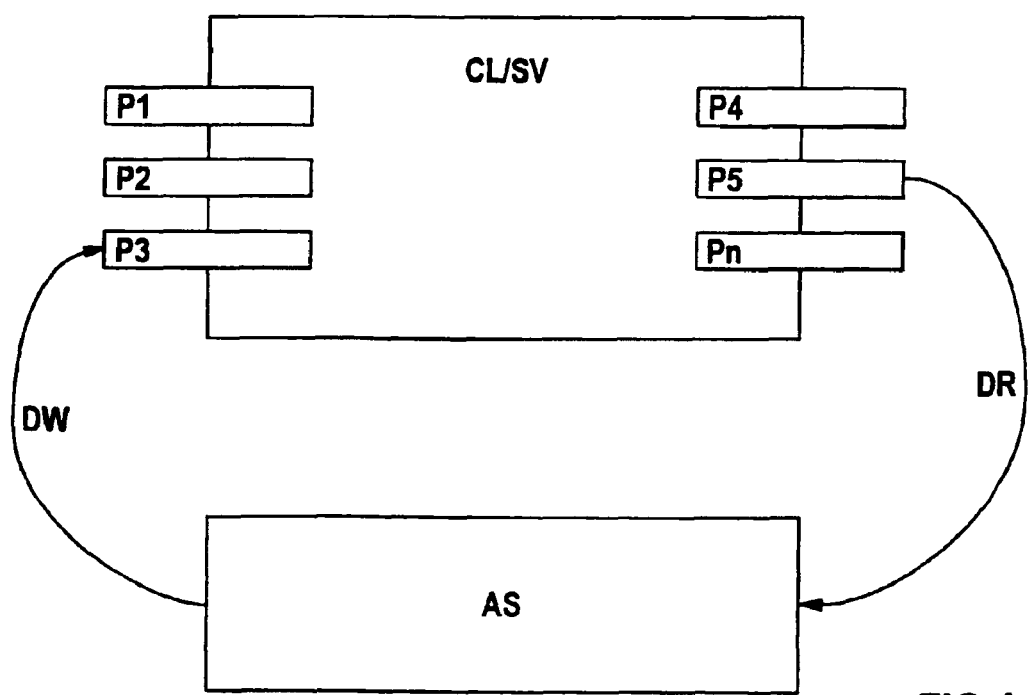
FIG. 4 shows a schematic depiction of an interaction between two software components according to the present invention.

FIG. 4 schematically depicts the manner in which, in accordance with the present invention, this disadvantage of the existing art is eliminated. A first software component, either a client object CL or a server object SV, interacts with an external control element. The fact that the concept is equally valid in principle for an interaction both between external control element AS and client CL and between the external control element and server is a further advantage of the present invention. Below, an interaction (a data or information transfer) between external control element AS and client CL, e.g., a visualization object CL., is described.

As shown in FIG. 4, client CL is embodied as a software component having external interfaces P1 . . . Pn (the so-called properties P1 . . . Pn). The data or information exchange from or to client CL is accomplished exclusively by way of properties P1 . . . Pn. One special aspect of the software components used is the fact that a data or information exchange by way of a property P1 . . . Pn brings about the execution of a code associated with the property P1 . . . Pn. This is the case if the software components, in this case clients CL, are implemented as so-called ActiveX controls or OCX components, which possess this functionality.

This functionality ensures that a datum arriving at a client CL brings about immediate execution of a specific code. In the case of a write data transfer DW, with which a data transfer from external control element AS to client CL (to its property P3) takes place, the presence of a datum for property P3 brings about immediate execution of a code of client CL associated with property P3. In the case of a client CL embodied as a visualization object, this specific code will principally comprise the analysis or evaluation of the transferred datum, as well as subsequent graphic visualization and consequently corresponding driving of visualization device VE. In the case of a read data transfer DR, with which a data transfer takes place from client CL (from its property P5) to external control element AS, what is brought about by reading out a datum of property P5 is immediate execution of a code of client CL associated with property P3. This can involve, for example, making available the datum to be transferred, or making available a subsequent datum for the next data transfer.

Figure 5:
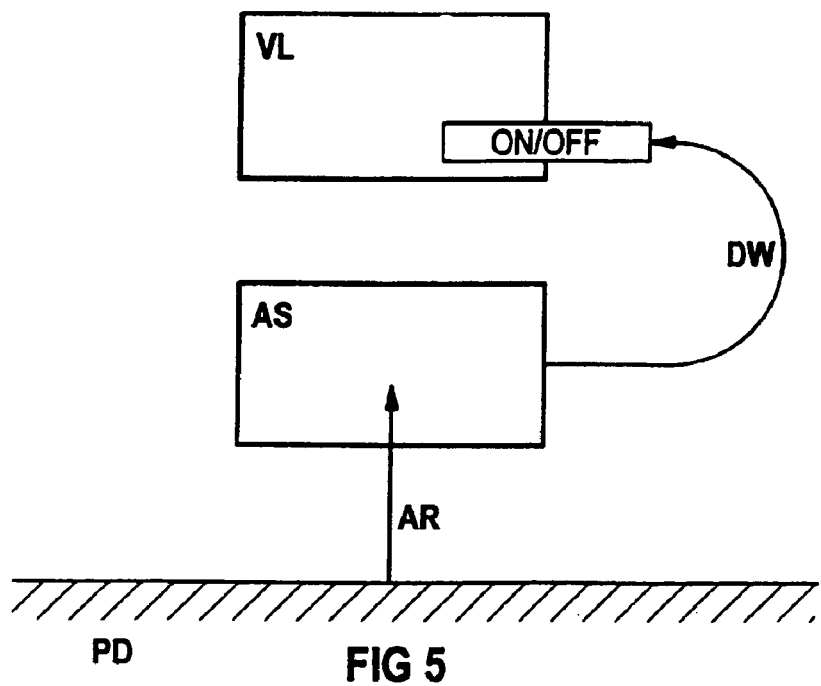
FIG. 5 shows a schematic depiction of an interaction between two software components according to the present invention with reference to a concrete visualization task.

A application will now be presented with reference to FIG. 5. Using a visualization object VL configured as client CL, the intention is to generate, on visualization device VE, the graphic depiction of a light that depicts in color-coded fashion a state of technical process TP; for example state A=red, complementary state A'=green.

Since visualization object VL is provided for depiction of a binary state, a single property P (labeled ON/OFF in FIG. 5) is sufficient as the external interface of visualization object VL.

External control element AS transfers the datum indicating the corresponding process state to property ON/OFF of visualization object VL. External control element AS, which in the example shown in FIG. 5 and in contrast to visualization object VL does not need to be embodied as an ActiveX control, can be embodied in the form of a "conventional" routine with sequential execution of the relevant program code. For example, the external control element at least cyclically performs a read call AR with which the process status that is to be visualized is read out from the process data, e.g., the process image of technical process TP. For external control element AS, the address of the datum which, within the totality of process data PD, indicates the process state to be visualized, is therefore explicitly stored—as has hitherto been usual—in the relevant code.

If, however, external control element AS is also embodied as an ActiveX control, there exists the possibility of adding it, by way of the so-called "drag and drop" technique, to a container to which the external control element then has access by way of the services offered by the container as a result of its characteristic of being a container, for example in order to identify further ActiveX controls contained in the container.

As in the example shown in FIG. 5, a fixed correlation exists between process data PD and external control element AS. In contrast thereto, such a correlation does not exist between visualization object VL and process data PD, nor between visualization object VL and external control element AS. A fixed linkage between visualization VL and process data PD has become unnecessary simply because external control element AS has been introduced. If, however, the fixed linkage between visualization object VL and external control element AS were introduced again, the introduction of an external control element AS functioning as a mere interface would result only in a displacement. The implementation actually intended, namely data-utilizing components VL independent of data-supplying components SV, would not thereby be achieved.

The intended independence is achieved by the use of property ON/OFF. Since the independence of the implementation necessarily requires that no knowledge about the configuration, design, and functionality of external control element AS be incorporated into the design of visualization object VL, and vice versa, the manner in which the source and destination of the necessary data and information transfers are agreed upon remains initially undecided.

Since the present invention can, for example, advantageously be used in a process visualization system or for startup masks, maintenance displays, etc., this will be explained with reference to a process visualization system of this kind.

For a process visualization system, an interactive design capability is usually provided for the screen masks that are to be displayed. The user selects, from a predefined and optionally interactively expandable library, the screen elements that are to be displayed. In this context, at least some of the selectable screen elements are visualization objects VL of the kind described above.

The user selects the visualization objects VL that are necessary in each case, and positions them on the screen mask provided for subsequent display.

In order to connect visualization objects VL to technical process TP or to its process peripherals, it is also necessary to place on the respective screen mask an object (external control element AS) which makes that connection possible.

Each time a visualization object VL is placed on the screen interface, the screen interface (functioning here as a container), "recognizes" visualization object VL that has been placed and is thus contained in it, i.e., in the screen interface object functioning as a container.

Since external control element AS must also be placed on the screen interface, the screen interface object also recognizes external control element AS. Since external control element AS is designed in conceptual terms to allow data transfer from and to visualization objects VL, the external control element contains at least code for querying the container (i.e., the screen interface) in which it is contained.

With this functionality, external control element As queries the container (the screen interface) as to the visualization objects VL contained in it, and has returned back to it the visualization objects VL contained in the container, or a reference to their instance names.

If the user wishes to define the interaction between external control element AS and visualization objects VL, he or she activates external control element AS—either during the interactive process of designing the screen mask or after its design is complete—using, for example, the mouse, whereupon a dialog box opens in which visualization objects VL reachable by external control element AS (i.e. visualization objects VL contained in the container and consequently placed on the screen interface) are displayed in plain text.

The user can then select one of the visualization objects VL and is then presented, for the particular visualization object VL selected, with the "properties" P accessible for that visualization object VL, from which the user in turn selects one.

Figure 6:
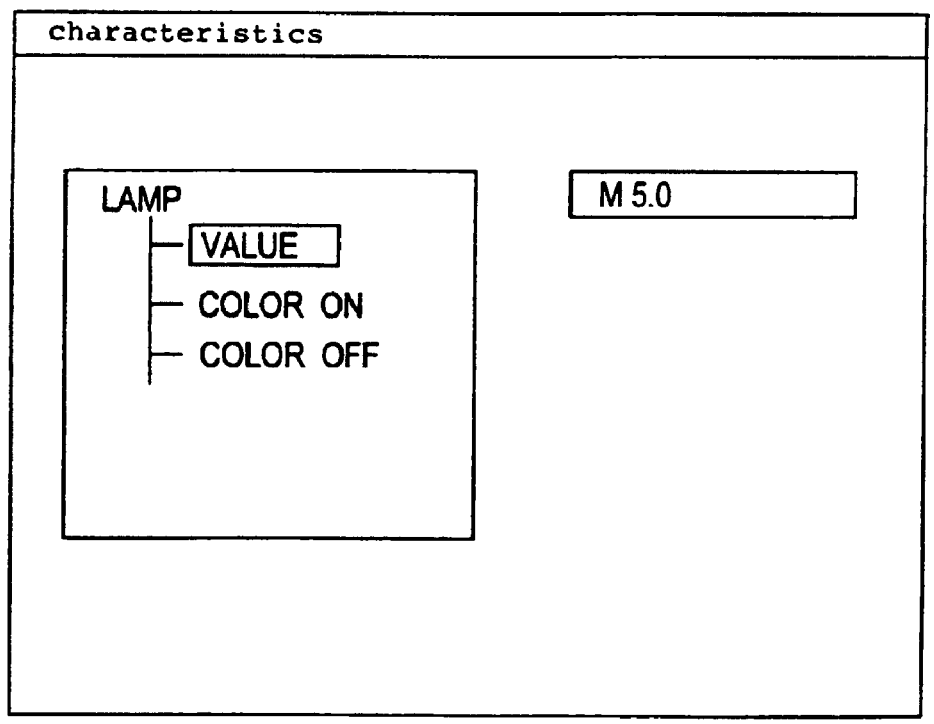
FIG. 6 shows an input mask for defining the data flow between two software component.

In the example shown in FIG. 5, in addition to external control element AS at least visualization object VL for graphic display of a light is placed on the screen interface. When external control element AS is selected in this manner, the user is therefore offered at least visualization object VL for selection. If visualization object VL is selected, at least property ON/OFF of visualization object VL is then offered for further selection. The selection is offered to the user in the form of the currently usual pull-down or drop-down menus, as depicted for example in FIG. 6, which are supplemented as necessary with structural information with which tree-like structures and the hierarchical relationships resulting therefrom can be depicted.

Once the desired property ON/OFF has been selected, the user indicates, in the input mask that is accessible after selection, the address of the datum that, for example, is to be written into the corresponding property ON/OFF. In the case of a visualization object VL depicting a light, which is intended simply to symbolize a binary state, at least one property ON/OFF that can express a state of 0 or 1 is provided for visualization object VL. This property ON/OFF is selected by the user and connected, for example, to an address of the data region of the visualized process TP, so that the light depicted on screen VE actually reacts with a color change when a 1 is present at the corresponding address, and the color change is reversed again when a 0 is present at the corresponding address.

If more complex situations are being visualized, for example the output behavior of a PID controller, the user can, for that purpose, place predefined visualization objects CL on his or her user interface. Let it be assumed that one such visualization object CL provided for visualization of the output behavior of a controller is the controller visualization object VR that is placed on the user interface as the component that substantially evaluates data.

The purpose of this controller visualization object VR is to display or influence the data of a controller R. Data transfer between visualization object VR and controller R is brought about by way of external control element AS, which is also placed on the user interface. The rest of the situation is explained with reference to the depiction in FIG. 7.

For the data transfer, visualization object VR makes available properties P1 . . . Pn with which the current output value of controller R can be transmitted to visualization object VR; with which a setpoint can be defined for controller R by visualization object VR; and with which, proceeding from visualization object VR, the usual control constants can be defined for controller R.

Since this number of properties P1 . . . Pn is identical for all instances of a controller visualization object VR, e.g., of the PID type, when linking visualization objects VR the user no longer proceeds as described previously, but rather now selects visualization object VR itself and assigns to visualization object VR the designation of the controller instance, e.g., "PID4711."

Controller R possesses a corresponding number of parameters X1 . . . Xn with which controller R can define the setpoint and the controller constants, and with which controller R can output the current output value.

All that now remains is the virtual connection between properties P1 . . . Pn of controller visualization object VR and parameters X1 . . . Xn of controller R.

For that purpose, visualization object VR outputs a property PT, embodied as table T or as a reference to a table T, in which the linkage between properties P of visualization component VR and parameters X of controller R is defined.

Once visualization component VR receives, for example, a property P for the setpoint, that setpoint must be transferred to the corresponding parameter X of controller R. If property P of visualization component VR for the setpoint is designated PS, and if at controller R the parameter for the setpoint is designated XS, the corresponding entry in table T is then, for example, [PS, R.XS]. This entry indicates that a linkage, provided for data transfer, exists between property PS of visualization component VR and parameter XS of controller R.

When visualization proceeds at runtime, or at the time when operation switches into runtime mode, external control element AS retrieves each of the elements present in the container. In the case of the simple visualization object CL, such as light VL shown in FIG. 5, in which the address of the information to be displayed was indicated directly to external control element AS, external control element AS monitors the respective data region PD at runtime and, in the event of a change in the monitored data region PD, forwards the changed datum to visualization object VL; forwarding of the datum is equivalent to calling a set-property method, which thus simultaneously initiates an action at visualization object VL whose property was set, i.e., in this case, for example, the desired color change.

At the point in time at which operation is switched into runtime mode, external control element AS, as already explained above, retrieves each of the objects present in the container. Each object is checked to determine whether it has a property PT, embodied as a table T, with connection information. This can be done, for example, by way of a naming convention, by the fact that property PT with connection information, embodied as table T, is given a predefined name, for example ConnectionTable.

In the case of a simple visualization object VL, such a property PT is not present; in the case of the more complex visualization object VR, external control element AS recognizes property PT embodied as table T and analyzes the entries in table T. Each entry in the table results in a connection between a property P of visualization object VR and a corresponding process value X.

Thus the entry [PS, R.XS] results, for example, in a connection between property PS and process value R.XS that is to be delivered to controller R. After the entries in table T have been interpreted, the external control element behaves exactly as if the connection implemented on the basis of the interpretation of the table entries had been input via the input dialog shown in FIG. 6.

The concept of external control element AS is thus also advantageously applicable in the case of more complex visualization objects VR, although in this case the user interaction is different, since in the case described above the user enters, for example, the controller name on visualization object VR. The basic idea of external control element AS applies to this case as well, since even with a constellation of this kind, no knowledge about any possible later communication relationship exists for visualization object VR at design time; in other words, visualization object VR has no explicit call code, which indeed would be implementable only if the communication relationship planned for runtime were already known at design time. In addition, in this case as well the activity proceeds exclusively from external control element AS.

Figure 7:
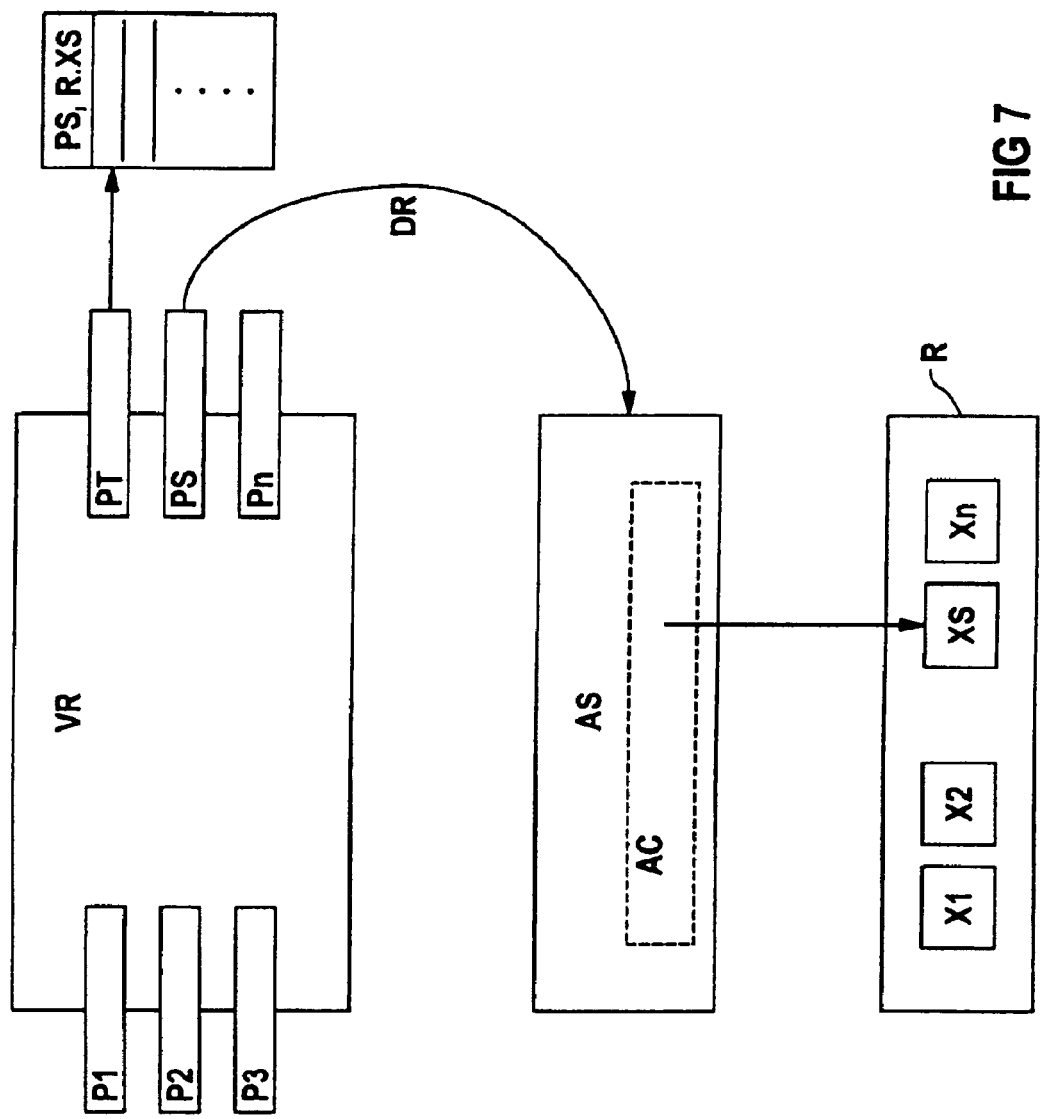
FIG. 7 shows a schematic depiction of an interaction with a more complex visualization component according to the invention, with reference to a concrete visualization task.

Deviating from the exemplary depiction of FIG. 7, controller R can also be implemented as an externally controllable substantially data-supplying component. The depiction in FIG. 4 already indicates that a substantially data-utilizing component (client CL) and a substantially data-supplying component (server SV) can in principle be externally controlled in identical fashion.

An example of an article that has appeared on the topic of ActiveX or OCX is one entitled "Bewegliche Ziele" [Moving targets], in the journal c't 12/96, Heinz Heise Verlag, Hannover, pp. 258–264.

An ActiveX control container offers as standard equipment the feature that it recognizes the elements contained in it, i.e., other ActiveX components; the container offers access to the instance names of the objects contained in it by the fact that the container manages a list of pointers to the objects contained in it, and the plain text designation of the particular objects can be queried based on the particular pointers that point to the particular contained objects.

It should be emphasized in this context that the OCX controls in fact make possible, communication or interaction beyond application-, hardware-, or platform-specific boundaries. An OCX control of an application A can communicate or interact with a further OCX control of an application B running on the same hardware or platform. This communication or interaction is possible even if application B is running on a generally comparable but remote and physically separated hardware unit, or even on a different hardware unit of a different platform, for example having a different operating system.

In an advantageous development of the present invention, usual software packages such as, for example, word processors, spreadsheets, or graphics programs are used as client CL components. This thus makes possible in principle, in the case in which a word processor is used, an interactive maintenance manual in which the contents of text objects are dependent on states of the technical process, so that, for example, specific maintenance instructions can be displayed along with the text objects depending on the error condition. In the case of a spreadsheet, it is particularly easy to transfer process data for logging and analysis purposes. The field of application of the present invention in fact extends sufficiently widely that in the case of a graphics program, specific graphics can be displayed as a function of process states, thus also allowing, for example, animated process visualizations. In all the aforesaid cases, it is worth mentioning that the data transfer is of course still confined to the respective process data. In the word-processing case, the particular texts—like the earlier graphic depictions of the light, for example, or the controller visualization—are already stored in visualization object CL and are displayed as a function of data of the technical process supplied via properties P.

All that remains to state in conclusion is that the flexibility of the concept according to the present invention is further increased if the data or information transmission system is developed in such a way that the external control element is also embodied as a software component having at least one property, the data or information exchange from or to the external control element being accomplished exclusively via the property, and the data or information exchange bringing about the execution of a code associated with the property.

In summary, the present invention may be described briefly as follows:

The present invention refers to the aspect of embodying a respective application-specific call code, necessary in the existing art, as an external control element implemented in a separate component, the external control element being usable in any desired containers without thereby modifying the containers themselves or even knowing them at the time the external control element is designed.

What is claimed is:

1. A data or information transmission system for the visualization of data, comprising:
   a microprocessor and associated memory device;
   a visualization device driven by the microprocessor and associate memory device;
   an arrangement to connect external sensors or actuators of at least one of a controlled and monitored technical process to the microprocessor and associated memory device;
   at least one substantially data-supplying component ("server"), data or information from the technical process being receivable by the server;
   at least one substantially data-utilizing component ("client"), the data or information from the technical process being visualized on the visualization device using the client, the client being a software component having at least one external interface ("respective properties"), no direct data or information exchange capability existing between the client and the server; and
   at least one control, management or distribution component ("external control component"), data or information exchange between the client and the server being effected using the external control component so that the data or information exchange takes place exclusively between the server and the external control element on the one hand, and between the external control element and the client on the other hand, the data or information exchange from or to the client being accomplished exclusively using the respective properties, the data or information exchange bringing about execution of code associated with the respective properties, wherein the client has no explicit call code, and wherein a datum received by the client via the data or information exchange brings about an immediate execution of a specific code.

2. The data or information transmission system according to claim 1, wherein the external control element includes an arrangement for identification of reachable ones of the at least one substantially data-utilizing component, a reference to each of the reachable ones being stored for the external control element, the references being user-selectable and the respective properties of the reachable ones being accessible using a user-selectable reference so that a communication relationship between the external control element and the client is definable by storing for the external control element at least one transmittable datum for each of the respective properties.

3. A data or information transmission system for the visualization of data, comprising:
   a microprocessor and associated memory device;
   a visualization device driven by the microprocessor and associate memory device;
   an arrangement to connect external sensors or actuators of at least one of a controlled and monitored technical process to the microprocessor and associated memory device;
   at least one substantially data-supplying component ("server"), data or information from the technical process being receivable by the server;
   at least one substantially data-utilizing component ("client"), the data or information from the technical process being visualized on the visualization device using the client, the client being a software component having at least one external interface ("respective properties"), no direct data or information exchange capability existing between the client and the server; and
   at least one control, management or distribution component ("external control component"), data or information exchange between the client and the server being effected using the external control component so that the data or information exchange takes place exclusively between the server and the external control element on the one hand, and between the external control element and the client on the other hand, the data or information exchange from or to the client being accomplished exclusively using the respective properties, the data or information exchange bringing about execution of code associated with the respective properties, wherein communication relationships for the client are not known at design time of the system, and wherein a datum received by the client via the data or information exchange brings about an immediate execution of a specific code.

* * * * *